(12) United States Patent
Spensley

(10) Patent No.: US 10,780,816 B2
(45) Date of Patent: Sep. 22, 2020

(54) BUNK WITH ADJUSTABLE ATTITUDE

(71) Applicant: Volvo Truck Corporation, Gothenburg (SE)

(72) Inventor: Gareth Howard Spensley, High Point, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/301,961

(22) PCT Filed: May 17, 2016

(86) PCT No.: PCT/US2016/032815
§ 371 (c)(1),
(2) Date: Nov. 15, 2018

(87) PCT Pub. No.: WO2017/200530
PCT Pub. Date: Nov. 23, 2017

(65) Prior Publication Data
US 2019/0143876 A1    May 16, 2019

(51) Int. Cl.
*B60P 3/39* (2006.01)
*A47C 17/80* (2006.01)
*B60N 3/00* (2006.01)

(52) U.S. Cl.
CPC ............... *B60P 3/39* (2013.01); *A47C 17/80* (2013.01); *B60N 3/008* (2013.01)

(58) Field of Classification Search
CPC .................................. B60P 3/39; B60N 3/008
USPC ..................................................... 296/190.02
See application file for complete search history.

(56) References Cited

U.S. PATENT DOCUMENTS

| | | | |
|---|---|---|---|
| 2,781,405 A | 2/1957 | Shukys et al. | |
| 4,084,276 A * | 4/1978 | Trexler, Jr. ............. | A47C 17/46 5/118 |
| 5,033,134 A | 7/1991 | Burchett | |
| 5,353,452 A * | 10/1994 | Rulis ...................... | A47C 17/40 5/136 |
| 5,875,502 A | 3/1999 | Kolbenstetter et al. | |
| 6,671,900 B2 | 1/2004 | Davis | |
| 7,594,286 B2 | 9/2009 | Williams | |

(Continued)

FOREIGN PATENT DOCUMENTS

| | | |
|---|---|---|
| DE | 102012023818 A1 | 6/2013 |
| EP | 2781405 A2 | 9/2014 |
| FR | 1248020 A | 12/1960 |

OTHER PUBLICATIONS

International Search Report and Written Opinion for PCT/US16/32815, dated Aug. 22, 2016, 9 pages.

(Continued)

*Primary Examiner* — Joseph D. Pape
(74) *Attorney, Agent, or Firm* — Withrow & Terranova, PLLC

(57) ABSTRACT

The present invention relates to a bunk with adjustable attitude for a vehicle cab. The bunk includes a hinge, bunk frame provided with a mattress support surface, a lock insert, and a plurality indexing holes. The bunk frame is pivotably mounted to the hinge about an axis so that at least one of the pitch or roll of the mattress support surface may be selectively adjusted. The lock insert releasably engages the indexing holes to releasably hold the bunk frame at a plurality of selectable pivot angles about the axis.

15 Claims, 12 Drawing Sheets

(56) References Cited

U.S. PATENT DOCUMENTS

| | | | |
|---|---|---|---|
| 8,468,626 B2 | 6/2013 | Carrier | |
| 8,800,077 B2 * | 8/2014 | Colombo | A47C 17/52 |
| | | | 5/136 |
| 2001/0044959 A1 | 11/2001 | Davis | |
| 2012/0060279 A1 | 3/2012 | Colombo | |

OTHER PUBLICATIONS

Extended European Search Report for European Patent Application No. 16902575.6, dated Dec. 6, 2019, 7 pages.

International Preliminary Report on Patentability for PCT/US16/32815, dated Nov. 29, 2018, 8 pages.

* cited by examiner

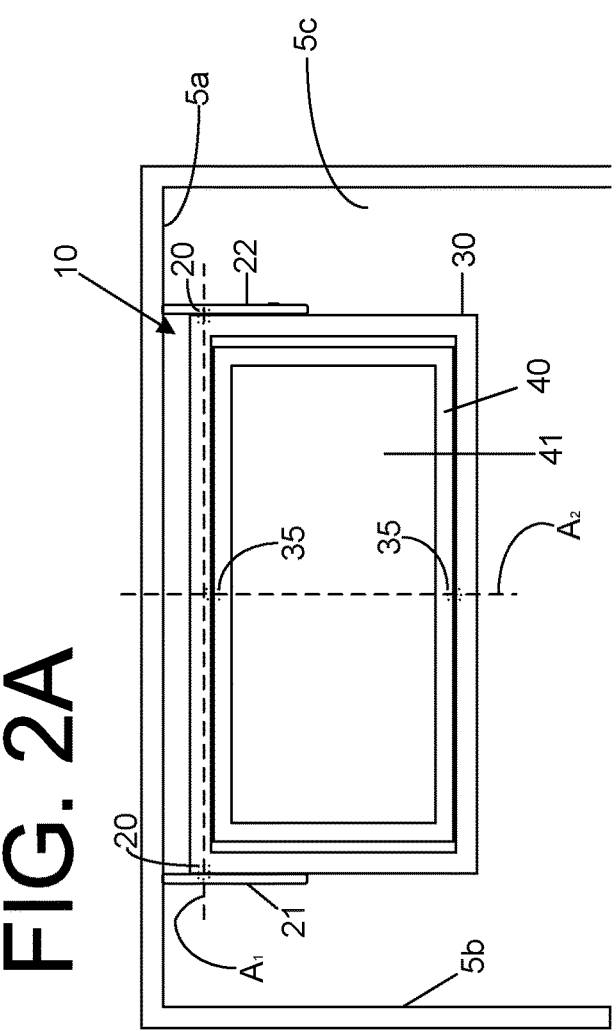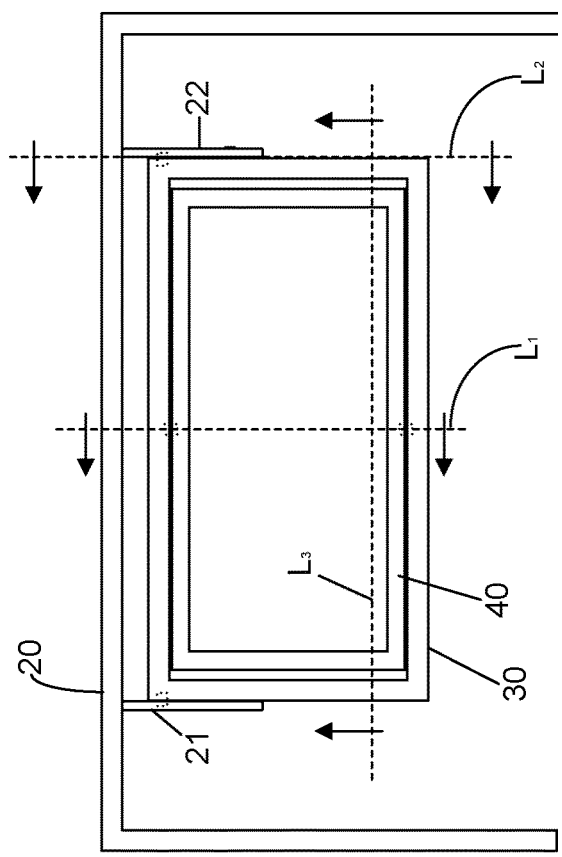

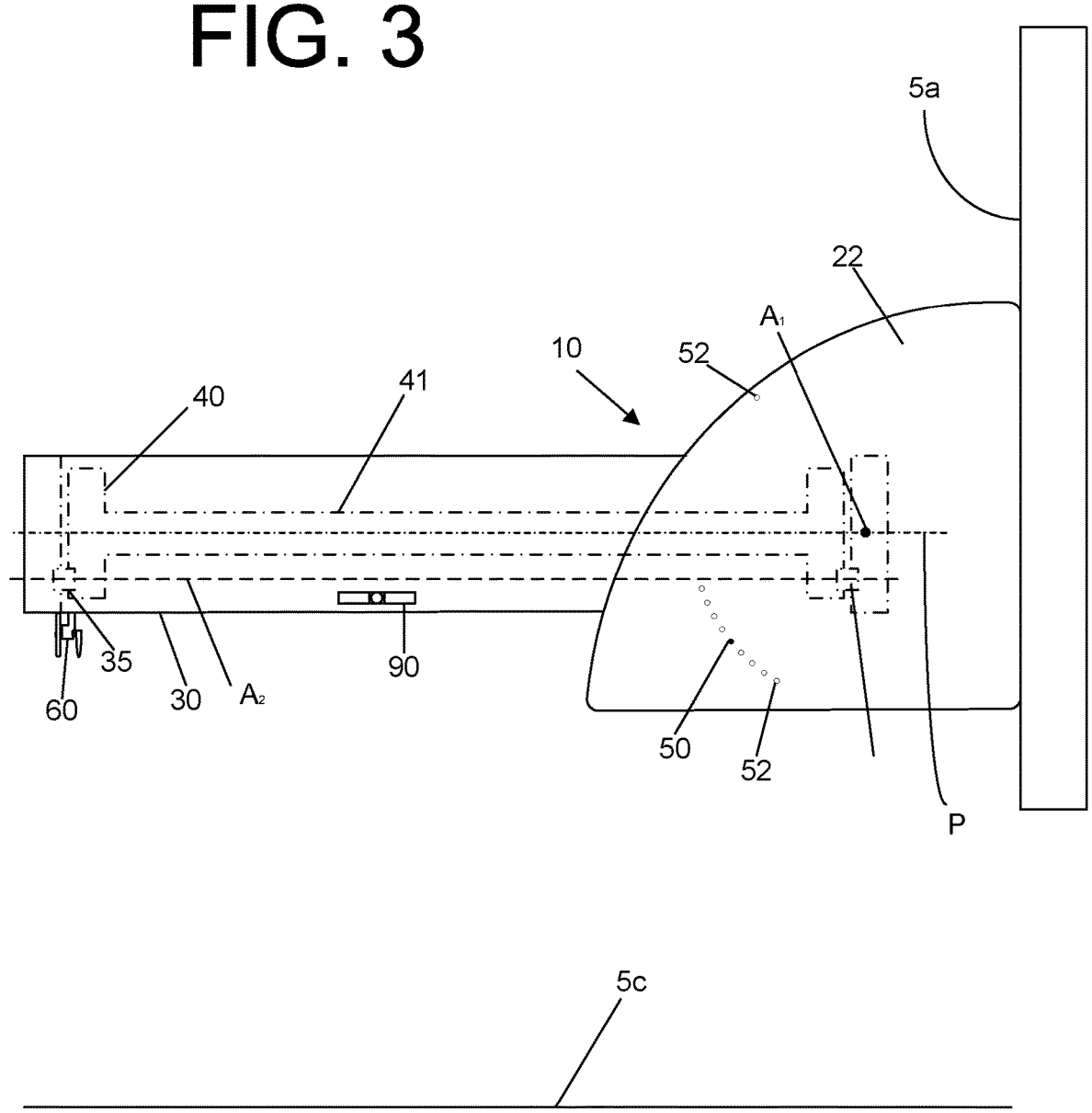

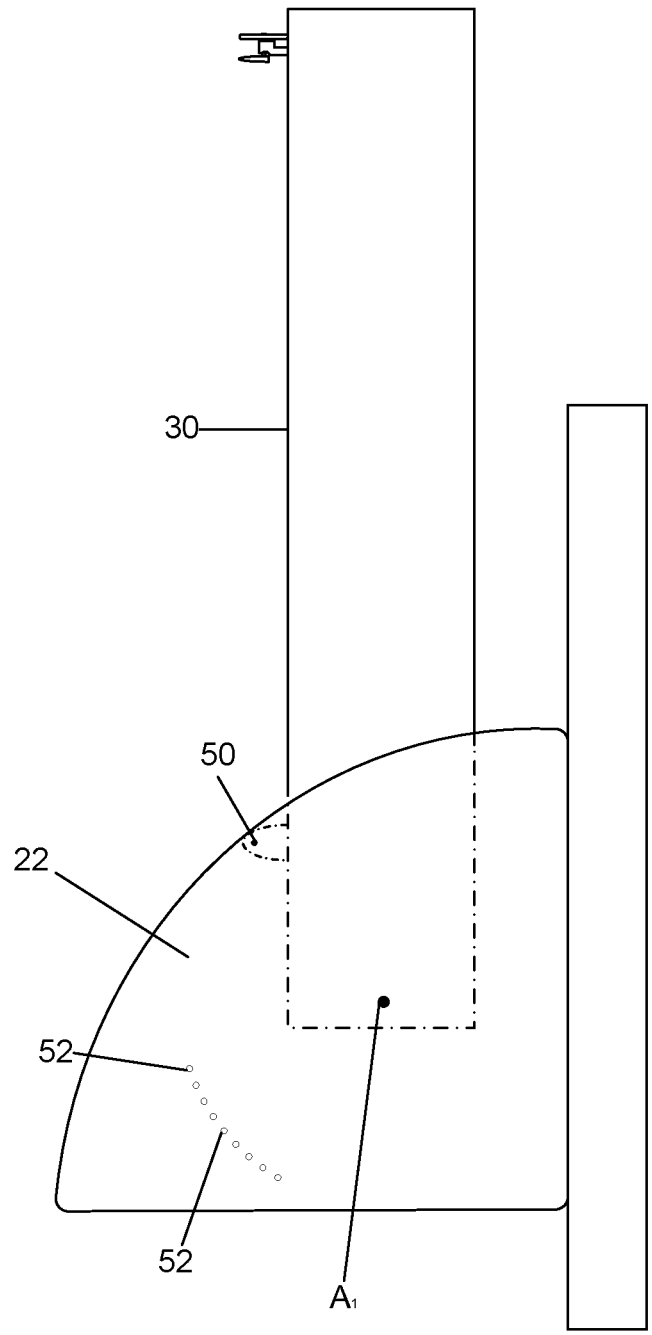

BUNK WITH ADJUSTABLE ATTITUDE

This application is a 35 USC 371 National Phase filing of International Application No. PCT/US2016/32815, filed May 17, 2016, the disclosure of which is incorporated herein by reference in its entirety.

FIELD OF THE INVENTION

The present invention relates to a vehicle bunk provided with an adjustable attitude.

BACKGROUND OF THE INVENTION

Vehicles, such as truck tractors, are at times provided with sleeper cabs that include a bunk for an occupant to sleep in. At times, however, the vehicle is not parked on a level surface. This creates an undesirable sleeping attitude in the bunk for the occupant.

The present invention is directed to a vehicle bunk with an adjustable attitude.

SUMMARY OF THE INVENTION

According to one embodiment of the present invention, a bunk with an adjustable attitude for a vehicle cab includes a hinge, a bunk frame provided with a mattress support surface, a lock insert and a plurality of indexing holes. The bunk frame is pivotably mounted to the hinge about an axis so that the pitch or roll of the mattress support surface may be selectively adjusted. The lock insert selectively and releasably engages the set of indexing holes to hold the bunk frame at the plurality of selectable pivot angles about the axis. At least one of the lock insert or the set of indexing holes traveling with the bunk frame and pivotably about the axis so that as the bunk frame pivots the lock insert aligns with the set of indexing holes at the plurality of selectable pivot angles.

According to another embodiment of the present invention, a bunk with adjustable attitude for a vehicle cab includes a hinge, a first bunk frame, a second bunk frame provided with a mattress support surface, first and second lock inserts, and first and second sets of indexing holes. The first bunk frame is pivotably mounted to the first hinge about a first axis. The second bunk frame is pivotable along with the first bunk frame about the first axis and is pivotably mounted to the first bunk frame about a second axis that extends at a 90° angle with respect to the first axis so that the pitch and roll of the mattress support surface are selectively adjustable. The first lock insert releasably engages the first set of indexing holes to releasably hold the first bunk frame and the second bunk frame at a plurality of common selectable pivot angles about the first axis. The second lock insert releasably engages the second set of indexing holes to releasably hold the second bunk frame at a plurality of selectable pivot angles about the second axis.

ASPECTS

According to one aspect of the present invention, a bunk with adjustable attitude for a vehicle cab comprises:
  a hinge;
  a bunk frame provided with a mattress support surface and being pivotably mounted to the hinge about an axis so that pitch or roll of the mattress support surface may be selectively adjusted;
  a lock insert that selectively and releasably engages a set of indexing holes to hold the bunk frame at the plurality of selectable pivot angles about the axis; and
  one of the lock insert or the set of indexing holes traveling with the bunk frame and pivotably about the axis so that as the bunk frame pivots the lock insert aligns with the set of indexing holes at the plurality of selectable pivot angles.

Preferably, the bunk with adjustable attitude for a vehicle cab further comprises a vehicle that includes the vehicle cab and a cab floor, wherein the selectable pivot angles allow the mattress support surface to selectively extend in a plane that better approximates being co-planar with a horizontal plane relative to a plane of the cab floor when the vehicle is on a non-level surface.

Preferably, the set of indexing holes are positioned in semi-circular fashion about the axis.

Preferably, the lock insert is spring biased to extend outwards into engagement with the set of indexing holes and may be manually retracted against the spring bias force.

Preferably, the lock insert is spring biased to releasably hold the lock insert in an engaged position or a retracted position.

Preferably, the bunk with adjustable attitude for a vehicle cab further comprises a level that measures the pitch or roll of the mattress support surface with respect to a horizontal plane.

According to another aspect of the present invention, a bunk with adjustable attitude for a vehicle cab comprises:
  a hinge;
  a first bunk frame pivotably mounted to the first hinge about a first axis;
  a second bunk frame provided with a mattress support surface, the second bunk frame being pivotable along with the first bunk frame about the first axis and pivotably mounted to the first bunk frame about a second axis that extends at a 90° angle with respect to the first axis so that pitch and roll of the mattress support surface are selectively adjustable; and
  a first lock insert that releasably engages a first set of indexing holes to releasably hold the first bunk frame and the second bunk frame at a plurality of common selectable pivot angles about the first axis and a second lock insert that releasably engages a second set of indexing holes to releasably hold the second bunk frame at a plurality of selectable pivot angles about the second axis.

Preferably, the bunk with adjustable attitude for a vehicle cab further comprises a vehicle that includes the vehicle cab and a cab floor, wherein the selectable pivot angles allow the mattress support surface to selectively extend in a plane that better approximates being co-planar with a horizontal plane relative to a plane of the cab floor when the vehicle is on a non-level surface.

Preferably, the first and second set of indexing holes are positioned in semi-circular fashion about the respective first and second axes and either the first lock insert or first set of indexing holes traveling with the bunk frame and pivotably about the first axis and either the second lock insert or second set of indexing holes traveling with the bunk frame and pivotably about the second axis so that as the first and second bunk frames pivot, the first and second lock inserts align with the respective first and second set of indexing holes at the plurality of selectable pivot angles.

Preferably, the first and second lock inserts are spring biased to extend outwards into engagement with the first and second set of indexing holes and may be manually retracted against the spring bias force.

Preferably, the first and second lock insert are spring biased to releasably hold the first and second lock inserts in an engaged position or a retracted position.

Preferably, the bunk with adjustable attitude for a vehicle cab further comprises levels that measure the pitch and roll of the mattress support surface with respect to a horizontal plane.

BRIEF DESCRIPTION OF THE DRAWINGS

FIG. 2A shows a top view of the vehicle cab and bunk according to one embodiment.

FIG. 2B shows a top view of the vehicle cab and bunk according to one embodiment.

FIG. 3 is a side perspective view of a bunk according to one embodiment showing, in dashed lines, a hidden sectional view taken along line $L_1$ in FIG. 2B.

FIG. 4 is a side perspective view of a bunk according to one embodiment showing, in dashed lines, a hidden sectional view taken along line $L_1$ in FIG. 2B.

DETAILED DESCRIPTION OF THE INVENTION

Figure 1:
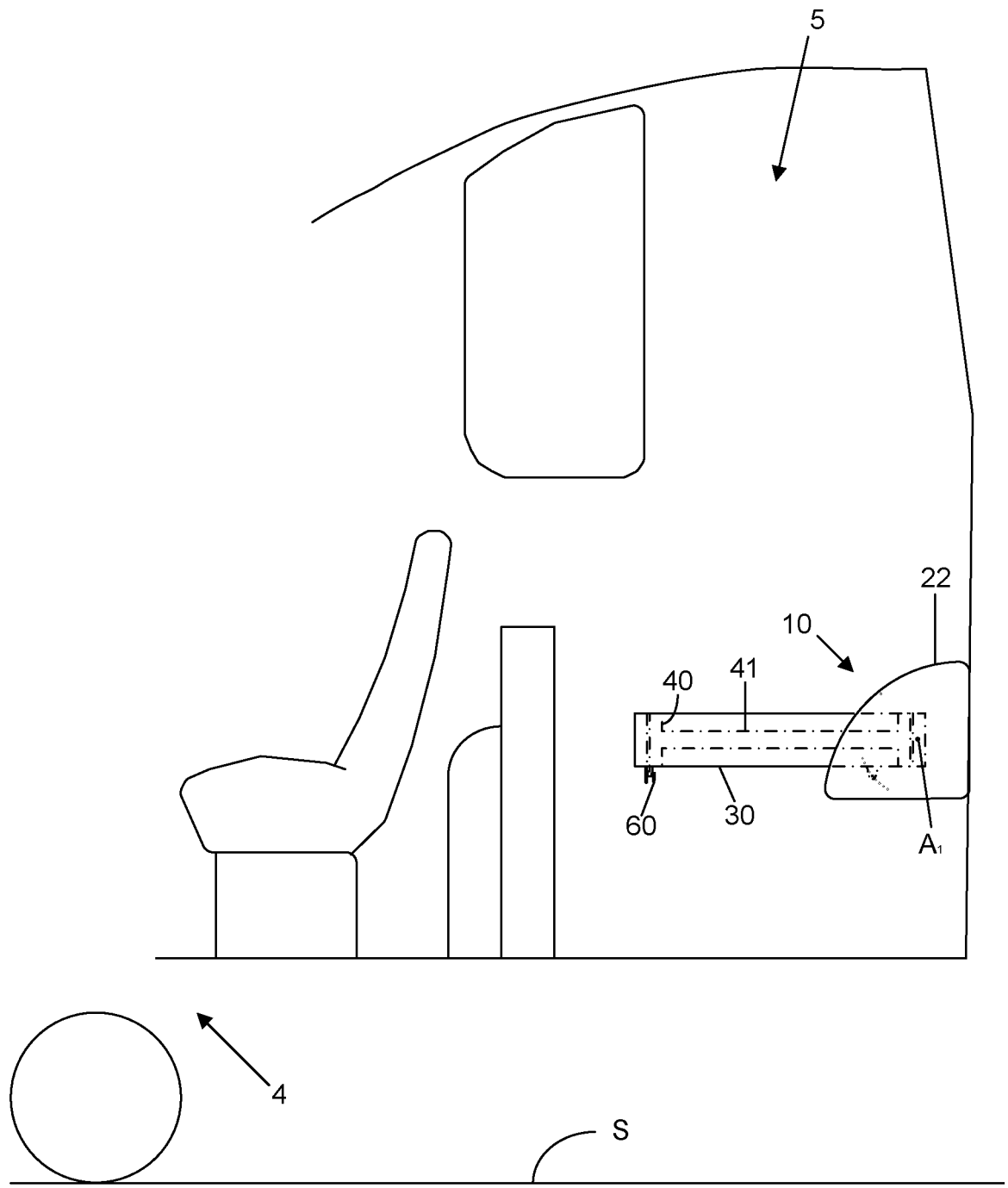
FIG. 1 shows a side perspective view of a vehicle, vehicle cab, and bunk according to one embodiment.

FIGS. 1-10 shows a bunk 10 with an adjustable attitude for a vehicle cab 5 of a vehicle 4. As shown the bunk 10 includes a hinge 20, a first bunk frame 30, a second bunk frame 40 provided with a mattress support surface 41, a first lock insert 50, and a second lock insert 60. As shown the bunk 10 is mounted to a hinge 20 formed on support brackets 21, 22 secured to back wall 5a of the vehicle cab 5; however, in alternative embodiments the bunk 10 may be mounted elsewhere in the vehicle cab, including, for example, and not limitation, to a hinge secured to the side wall, such as side wall 5b or a hinge secured to the cab floor 5c.

According to one aspect of the present embodiment, the attitude of the mattress support surface 41 is adjustable.

According to another aspect of the present embodiment, the attitude of the mattress support surface 41 adjustable relative to the vehicle cab floor 5c. According to yet another aspect of the present, the attitude of the mattress support surface 41 is adjustable relative to surface S that supports the vehicle 4. According to still yet another aspect of the present, the attitude of the mattress support surface 41 is adjustable relative to a horizontal plane H. Advantageously, in the present embodiment both the pitch and the roll of the mattress support surface 41 are selectively adjustable.

Figure 5:
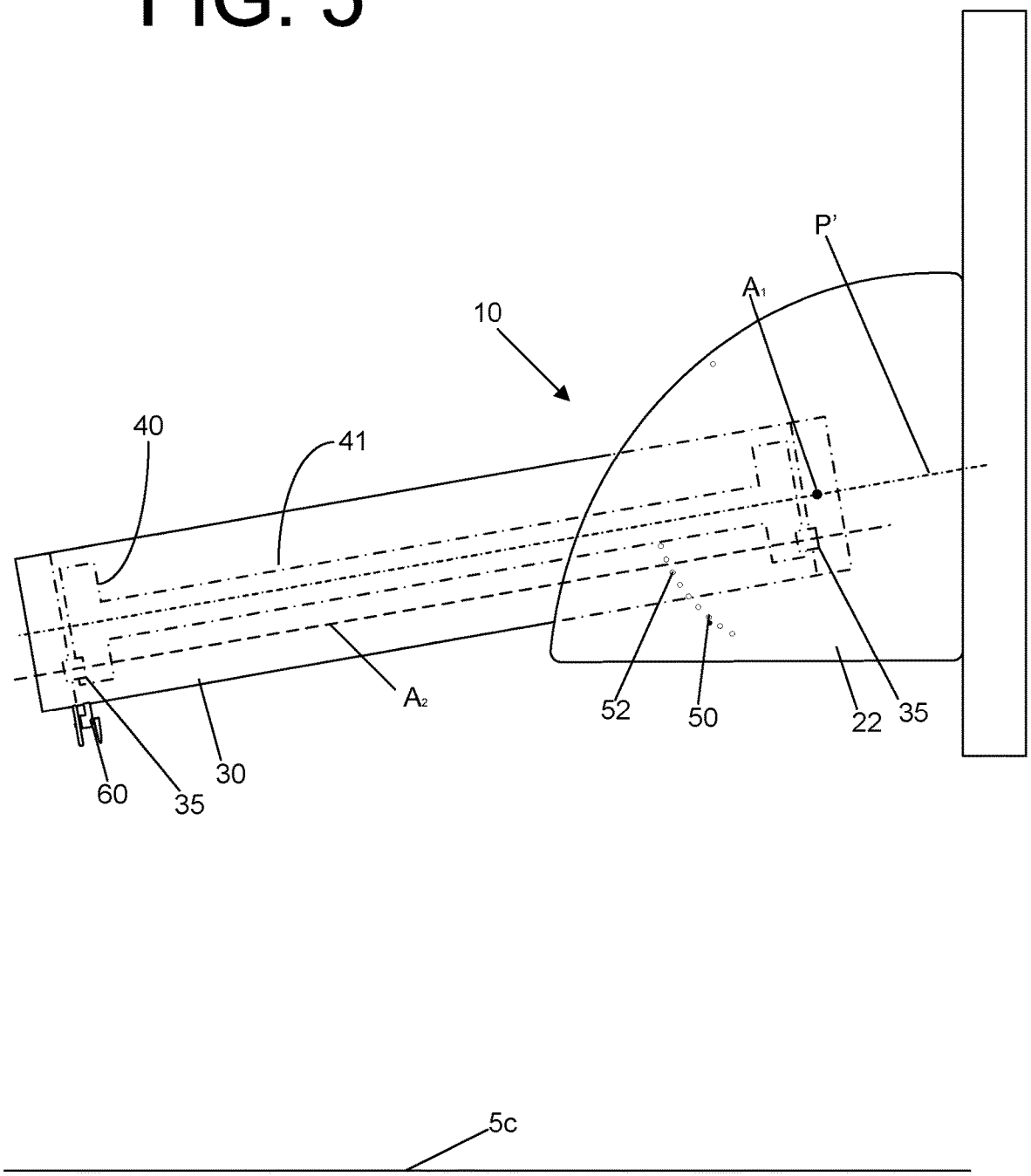
FIG. 5 is a side perspective view of a bunk according to one embodiment showing, in dashed lines, a hidden sectional view taken along line $L_2$ in FIG. 2B.
Figure 6:
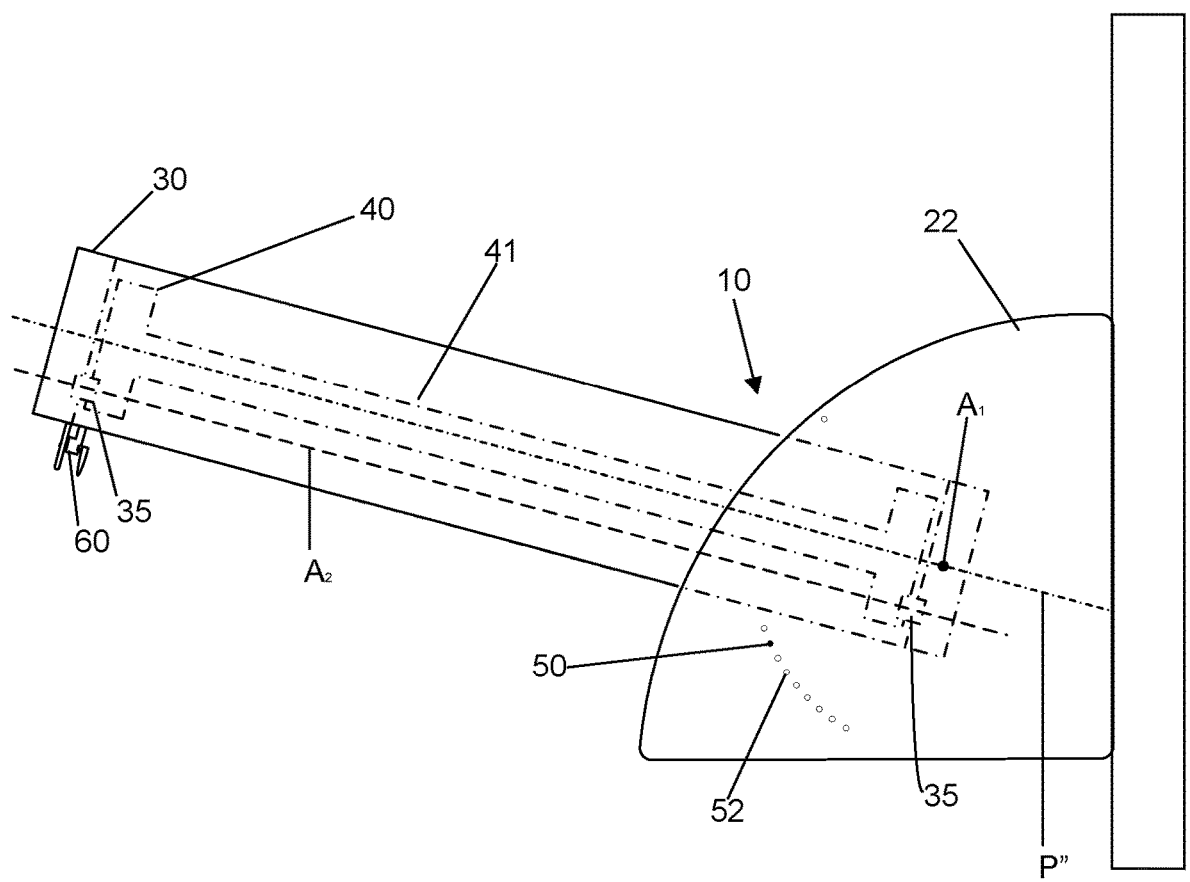
FIG. 6 is a side perspective view of a bunk according to one embodiment showing, in dashed lines, a hidden sectional view taken along line $L_1$ in FIG. 2B.

Turning now to FIGS. 1-6 and 10, the first bunk frame 30 is pivotably mounted to the hinge 20 about a first axis $A_1$. As shown in FIG. 4, the first bunk frame 30 may be pivoted about the first axis $A_1$ into a vertically stowed position, whereat the bunk 10 is inaccessible to an occupant. As shown in FIGS. 3, 5 and 6, the first bunk frame 30 may also be pivoted about the first axis $A_1$ into a plurality of horizontally deployed positions, whereat the bunk 10 is accessible to an occupant.

Advantageously, each of the horizontally deployed positions is at a different selectable pivot angle about the first axis $A_1$. As shown in FIG. 3, the first bunk frame 30 may be pivoted so that the first bunk frame 30 extends about the first axis $A_1$ in plane P, which is substantially parallel to the cab floor 5c. As shown, in FIGS. 5 and 6, relative to when the first bunk frame 30 extends about the first axis $A_1$ in plane P, the first bunk frame 30 may also be pivoted clockwise and counter-clockwise about the first axis $A_1$ so that the first bunk frame 30 extends from the first axis $A_1$ in planes, such as, for example, planes P' and P'', that intersect at acute angles with plane P.

As shown in FIGS. 1-6 and 10, as the first bunk frame 30 pivots about the first axis $A_1$, the second bunk frame 40 pivots along with the first bunk frame 30 about the first axis $A_1$. As shown, once a selectable pivot angle is selected, the first lock insert 50 releasably holds the first bunk frame 30 and the second bunk frame 40 at a plurality of common selectable pivot angles about the first axis $A_1$.

According to one aspect of the present embodiment, pivoting the first and second bunk frames 30, 40 about the first axis $A_1$ allows the pitch of the plane that the first and second bunk frames 30, 40 extend in from axis $A_1$ to be selectively adjusted relative to the cab floor 5c. According to another aspect of the present embodiment, pivoting the first and second bunk frames 30, 40 about the first axis $A_1$ allows the pitch of the mattress support surface 41 of the second bunk frame 40 to be selectively adjusted relative to the cab floor 5c. According to yet another aspect of the present embodiment, pivoting the first and second bunk frames 30, 40 about the first axis $A_1$ allows the pitch of the mattress M to be selectively adjusted relative to the cab floor 5c.

Figure 10:
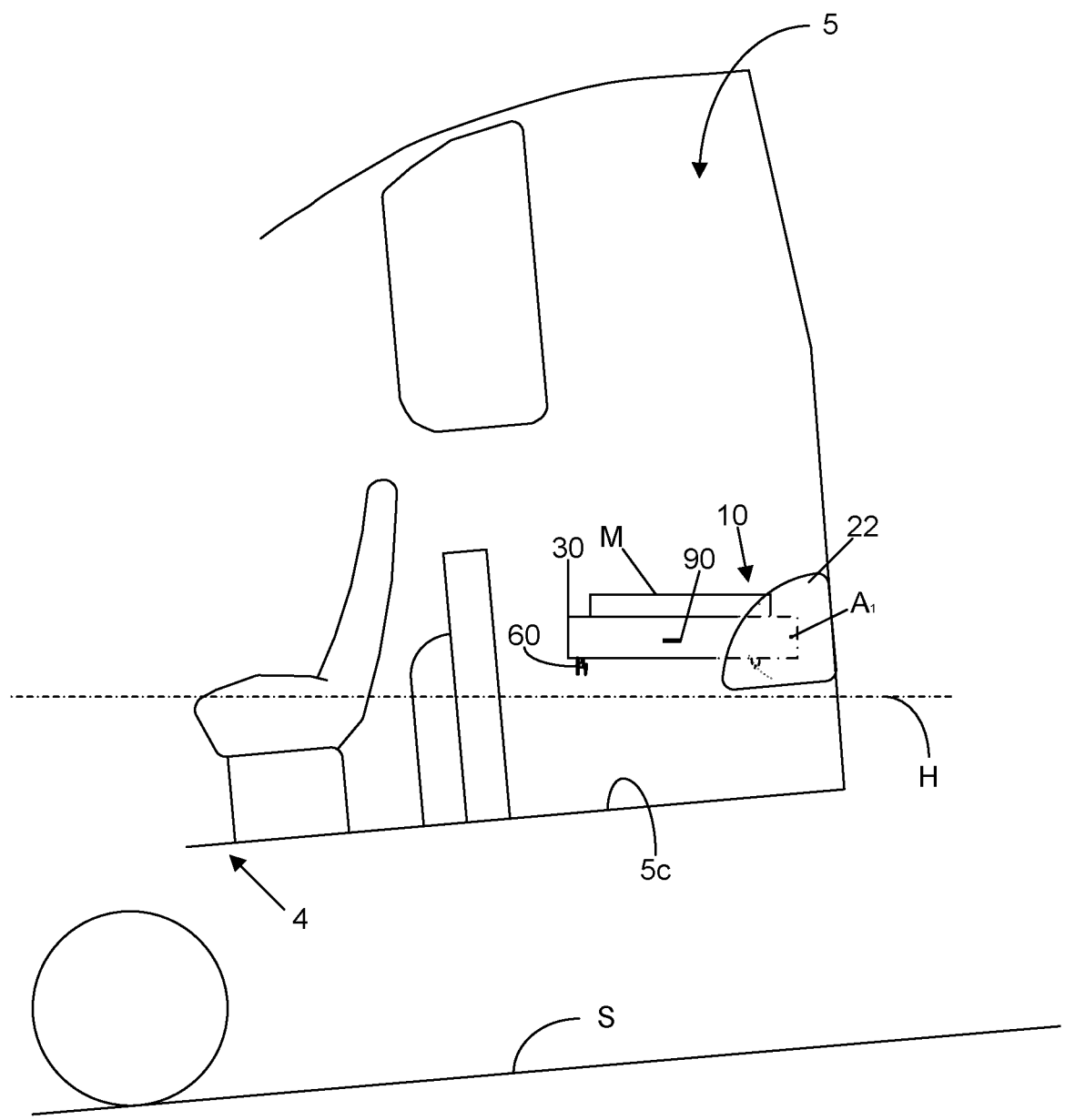
FIG. 10 shows a side perspective view of a vehicle, vehicle cab, and bunk according to one embodiment.

According to one aspect of the present embodiment, pivoting the first and second bunk frames 30, 40 about the first axis $A_1$ allows the pitch of the plane that the first and second bunk frames 30, 40 extend in from axis $A_1$ to be selectively adjusted relative to a horizontal plane H (FIG. 10). According to another aspect of the present embodiment, pivoting the first and second bunk frames 30, 40 about the first axis $A_1$ allows the pitch of the mattress support surface 41 of the second bunk frame 40 to be selectively adjusted relative to a horizontal plane H (FIG. 10). According to yet another aspect of the present embodiment, pivoting the first and second bunk frames 30, 40 about the first axis $A_1$ allows the pitch of the mattress M to be selectively adjusted relative to a horizontal plane H (FIG. 10).

Figure 7:
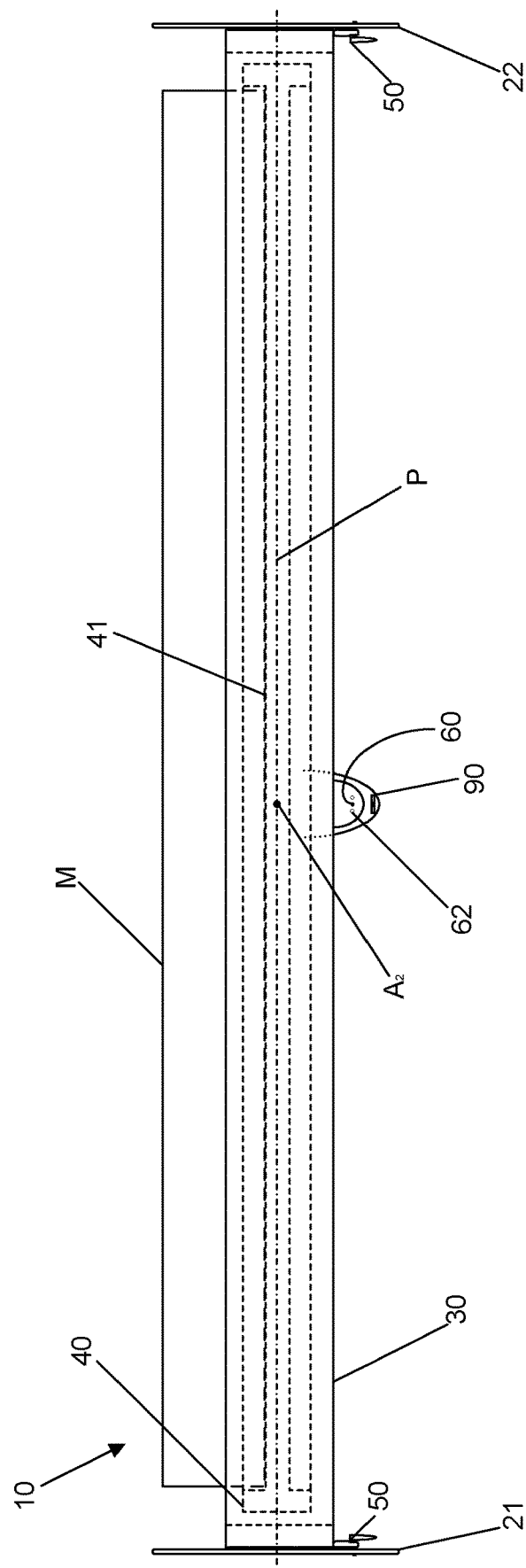
FIG. 7 is a forward perspective view of a bunk according to one embodiment showing, in dashed lines, a hidden sectional view taken along line $L_3$ in FIG. 2B.
Figure 8:
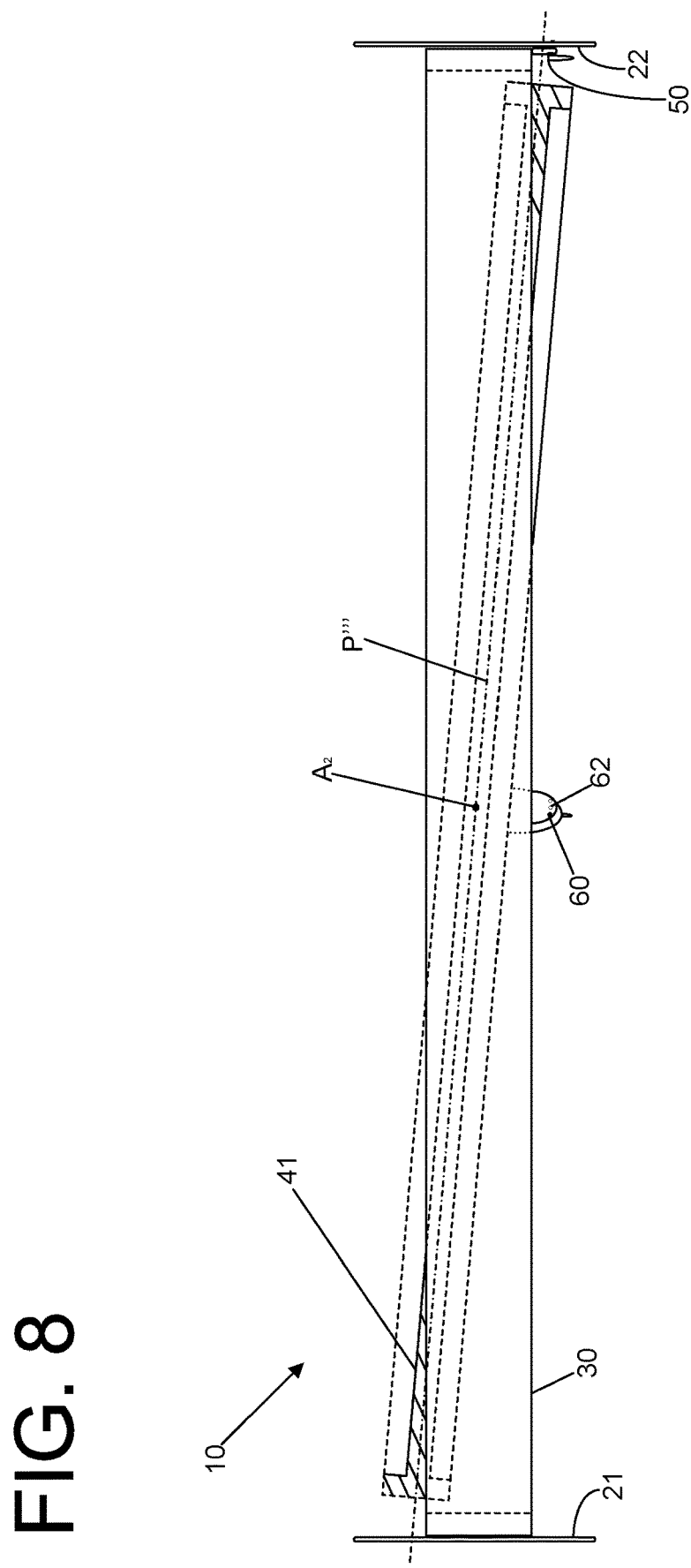
FIG. 8 is a forward perspective view of a bunk according to one embodiment showing, in dashed lines, a hidden sectional view taken along line $L_3$ in FIG. 2B.
Figure 9:
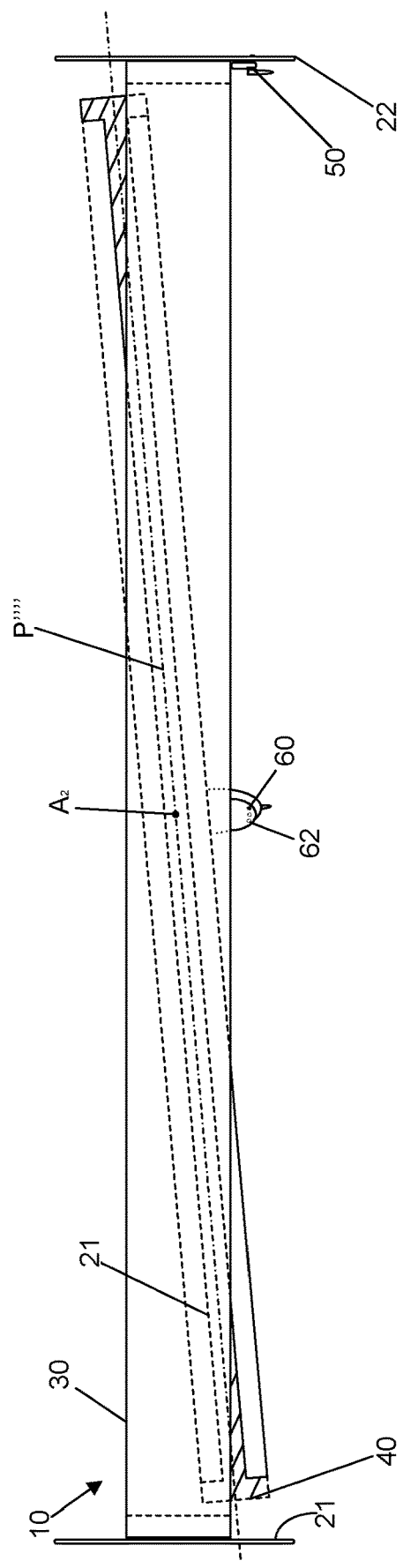
FIG. 9 is a forward perspective view of a bunk according to one embodiment showing, in dashed lines, a hidden sectional view taken along line $L_3$ in FIG. 2B.

Turning now to FIGS. 2A and 7-9, the second bunk frame 40 is pivotably mounted to the first bunk frame 30 at hinge 35 about a second axis $A_2$, which extends at a 90° angle with respect to the first axis $A_1$. As shown in FIGS. 7-9, the second bunk frame 40 pivots with respect to the first bunk frame 30 about the second axis $A_2$ into a number of selectable pivot positions that are each at a different selectable pivot angle about the second axis $A_2$.

As shown in FIG. 7, the second bunk frame 40 may be pivoted about second axis $A_2$ so that the second bunk frame 40 extends in plane P that is substantially parallel to the cab floor 5c. As shown, in FIGS. 8 and 9, relative to when the second bunk frame 40 extends from the second axis $A_2$ in plane P, the second bunk frame 30 may also be pivoted clockwise and counter-clockwise about the second axis $A_2$ so that the second bunk frame 30 extends from the second axis $A_2$ in planes, such as, for example, planes P''' and P'''', that intersect plane P at acute angles. Advantageously, in the present embodiment, pivoting the second bunk frames 40 about the second axis $A_2$ allows the roll of the mattress support surface 41 of the second bunk frame 40 to be selectively adjusted relative to the cab floor 5c. As shown, the second lock insert 60 releasably holds the second bunk frame 40 at a plurality of selectable pivot angles about the second axis $A_2$.

According to one aspect of the present embodiment, pivoting the second bunk frame 40 about the second axis $A_2$ allows the roll of the plane that the second bunk frames 30, 40 extends in from axis $A_2$ to be selectively adjusted relative to the cab floor 5c. According to another aspect of the present embodiment, pivoting the second bunk frame 40 about the second axis $A_2$ allows the roll of the mattress support surface 41 of the second bunk frame 40 to be selectively adjusted relative to the cab floor 5c. According to yet another aspect of the present embodiment, pivoting the second bunk frame 40 about the second axis $A_2$ allows the roll of the mattress M to be selectively adjusted relative to the cab floor 5c.

According to one aspect of the present embodiment, pivoting the second bunk frame 40 about the second axis $A_2$ allows the roll of the plane that the second bunk frames 30, 40 extends in from axis $A_2$ to be selectively adjusted relative to a horizontal plane H (FIG. 10). According to another aspect of the present embodiment, pivoting the second bunk frame 40 about the second axis $A_2$ allows the roll of the mattress support surface 41 of the second bunk frame 40 to be selectively adjusted relative to a horizontal plane H (FIG. 10). According to yet another aspect of the present embodiment, pivoting the second bunk frame 40 about the second axis $A_2$ allows the roll of the mattress M to be selectively adjusted relative to a horizontal plane H (FIG. 10).

According to one aspect of the present embodiment, the selectable pivot angles about axis $A_1$ and $A_2$ allow the first and second bunk frames 30 and 40 to selectively extend in planes that better approximate being co-planar with horizontal plane H, as shown in FIG. 10, relative to the plane of the cab floor 5c when the vehicle 4 is on an non-level surface S. According to one aspect of the present embodiment, the selectable pivot angles about axes $A_1$ and $A_2$ allow the mattress support surface 41 to selectively extend in a plane better approximates being co-planar with horizontal plane H, as shown in FIG. 10, relative to the plane of the cab floor 5c when the vehicle 4 is on an non-level surface S. According to one yet another aspect of the present embodiment, the selectable pivot angles about axes $A_1$ and $A_2$ allow mattress M to selectively extend in a plane better approximates being co-planar with horizontal plane H, as shown in FIG. 10, relative to the plane of the cab floor 5c when the vehicle 4 is on a non-level surface S.

As shown best in FIGS. 3-9 and 11-12, the first and second lock inserts 50, 60 selectively and releasably engage first and second sets of indexing holes 52, 62 that are positioned in semi-circular fashion about axes $A_1$ and $A_2$, respectively, in order to releasably hold the first and second bunk frames 30, 40 at various selectable pivot angles about the first axis $A_1$ and to releasably hold the second bunk frame 40 at various selectable pivot angles about the second axis $A_2$. As shown, the first set of indexing holes 52 that cooperate with the first lock insert 50 are defined in support bracket 22 and the first lock insert 50 is mounted on the first bunk frame 30 to travel with the first bunk frame and pivotably about first axis $A_1$ and align with the indexing holes 52 at selectable pivot angles. If desired, within the scope of the present embodiment, as shown in FIG. 7, another first lock insert 50 may be provided and a corresponding set of indexing holes (not shown) may be defined in support bracket 22.

Figure 13:
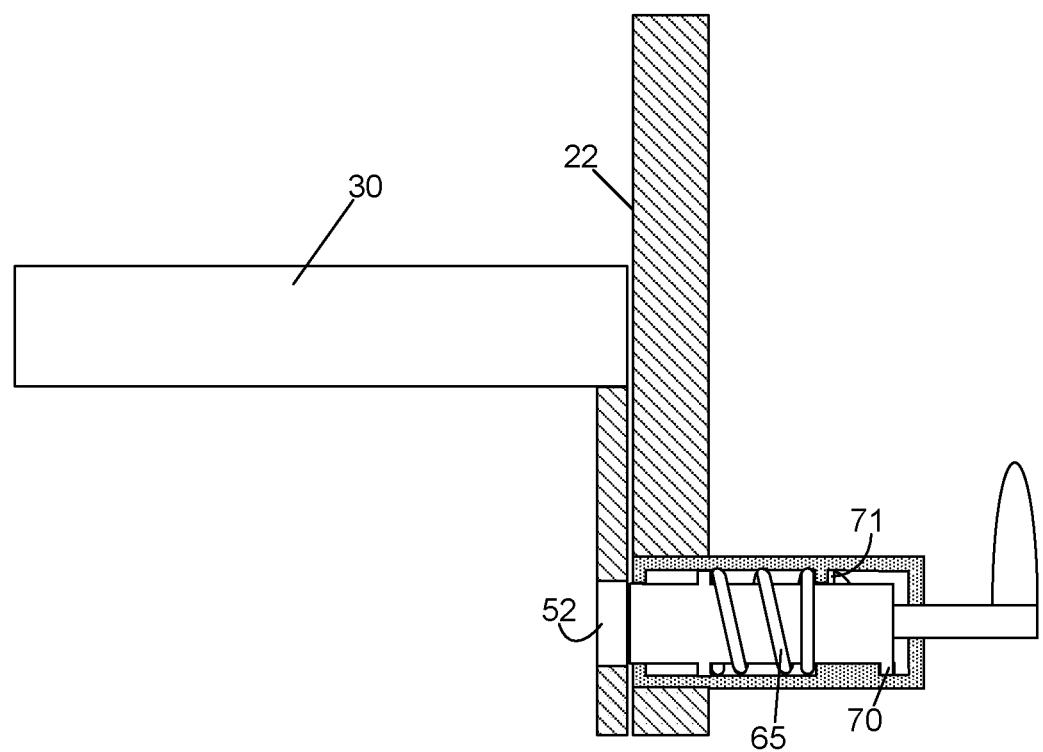
FIG. 13 shows a lock insert and an indexing hole according to one embodiment.

Also shown, the second set of indexing holes 62 that cooperate with the second lock insert 60 may be defined on the first bunk frame 30 and the second lock insert 60 may be mounted on the second bunk frame 40 to travel with the first bunk frame and pivotably about second axis $A_2$ and align with the indexing holes 62 at selectable pivot angles. Alternatively, within the scope of the present embodiment, as shown by the example in FIG. 13, the indexing holes 52 may be mounted on the first bunk frame 30 and the first lock insert 50 may be located on support bracket 22. Similarly, within the scope of the present embodiment, the indexing holes 62 may be located on the second bunk frame 40 and the second lock insert 60 may be located on the first bunk frame 30.

Figure 11:
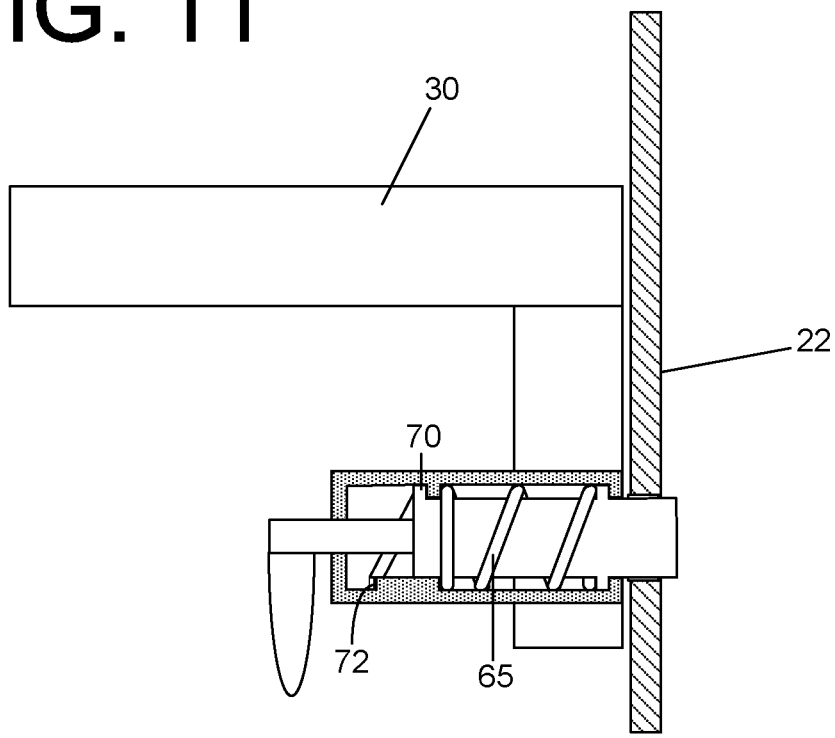
FIG. 11 shows a lock insert and an indexing hole according to one embodiment.
Figure 12:
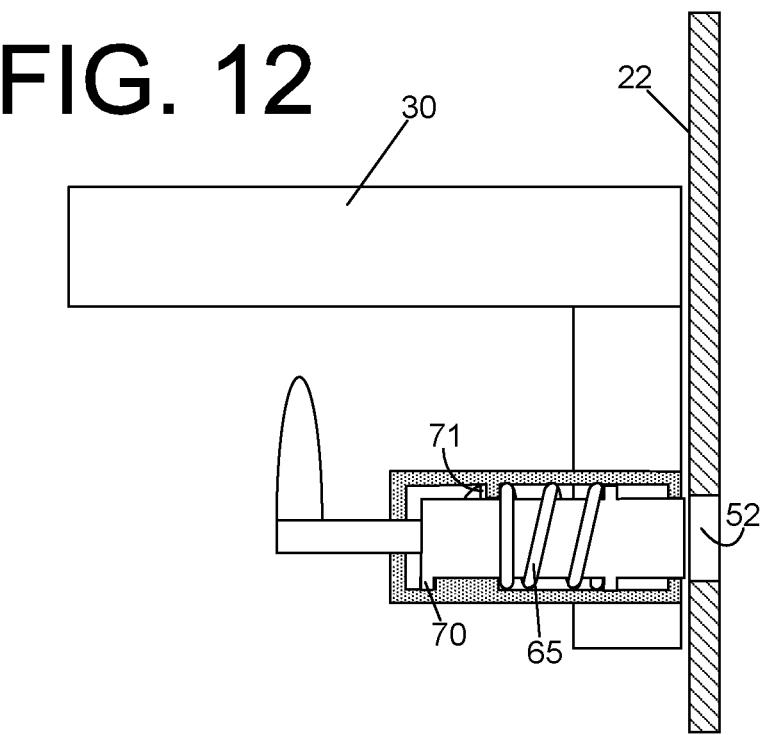
FIG. 12 shows a lock insert and an indexing hole according to one embodiment.

In the present embodiment, as shown in FIGS. 11 and 12, the first and second lock inserts 50, 60 are preferably spring 65 biased lock inserts that are biased to extend outwards into engagement with the first and second sets of indexing holes 52, 62 and that may be manually retracted against the spring bias force. As shown, the lock inserts are preferably spring biased into either an engaged position 85 or retracted position 86, such as, for example, and not limitation, by including a shoulder 70 that is biased by spring 65 into depressions 71 or 72 to releasably hold the lock inserts 50, 60 in an engaged position 85 or a retracted position 86, respectively. Although the present embodiment is illustrated with spring biased lock inserts, within the scope of the present embodiment, the first and second lock inserts 50, 60 may be any object, such as, for example, and not limitation, a quick release detent pin, plunger, or ball that releasably engages indexing holes 52, 62 to releasably hold the first and second bunk frames 30, 40 at various selectable pivot angles about the first axis $A_1$ and to releasably hold the second bunk frame 40 at various selectable pivot angles about the second axis $A_2$.

Turning now to FIGS. 3 and 7, as shown, the first and second bunk frames 30, 40 may be provided with levels 90, oriented 90° with respect to each other, that measure the pitch and roll of the mattress support surface 41 with respect to a horizontal plane H, as shown in FIG. 10. According to one aspect of the present embodiment, the levels allow an occupant to more easily select the appropriate selectable pivot angles about axes $A_1$ and $A_2$ that cause the first and second bunk frames 30 and 40 to extend in plane(s) that closest approximate being co-planar with horizontal plane H, as shown in FIG. 10. According to one aspect of the present embodiment, the levels allow an occupant to more easily select the appropriate selectable pivot angles about axes $A_1$ and $A_2$ that cause the mattress support surface 41 to extend in a plane that closest approximates being co-planar with horizontal plane H, as shown in FIG. 10. According to one yet another aspect of the present embodiment, the levels allow an occupant to more easily select the appropriate selectable pivot angles about axes $A_1$ and $A_2$ that cause mattress M to extend in a plane that closest approximates being co-planar with horizontal plane H, as shown in FIG. 10.

The present description depicts specific examples to teach those skilled in the art how to make and use the best mode of the invention. For the purpose of teaching inventive principles, some conventional aspects have been simplified or omitted. By way of example, within the scope of the present embodiment, the hinges 20, 35 may be associated with torsion springs that assist with controlled pivoting or lighten the lifting load during pivoting. By way of yet another example, within the scope of the present embodiment, the axis $A_1$ and $A_2$ may be oriented in vehicle cab in opposite fashion, whereby pivoting about axis $A_1$ adjusts the roll and pivoting about axis $A_2$ adjusts pitch. By way of yet another example, within the scope of the present embodiment, rather than both the pitch and roll being adjustable, only one of the pitch or the roll may be adjustable. By way of example, rather than including two frames 30 and 40, the bunk may include a single pivotable bunk frame, such a bunk frame 30 provided with a mattress support surface, such as surface 41, where only the roll or, alternatively, the pitch, may be adjustable, as described above.

Accordingly, the detailed descriptions of the above embodiments are not exhaustive descriptions of all embodiments contemplated by the inventors to be within the scope of the invention. Those skilled in the art will appreciate variations from these examples that fall within the scope of the invention. Persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims and equivalents thereof.

I claim:

1. A bunk with adjustable attitude for a vehicle cab, comprising:
   a hinge;
   a bunk frame provided with a mattress support surface and being pivotably mounted to the hinge about an axis so that pitch or roll of the mattress support surface may be selectively adjusted;
   a lock insert that selectively and releasably engages a set of indexing holes to hold the bunk frame at a plurality of selectable pivot angles about the axis, the plurality of selectable pivot angles comprising a vertically stowed position and a plurality of substantially horizontal positions; and
   one of the lock insert or the set of indexing holes fixed relative to the bunk frame and pivotable about the axis so that as the bunk frame pivots, the lock insert aligns with the set of indexing holes at the plurality of selectable pivot angles.

2. The bunk with adjustable attitude for a vehicle cab according to claim 1, further comprising a vehicle that includes the vehicle cab and a cab floor, wherein the plurality of selectable pivot angles allow the mattress support surface to selectively extend in a plane that better approximates being co-planar with a horizontal plane relative to a plane of the cab floor when the vehicle is on a non-level surface.

3. The bunk with adjustable attitude for a vehicle cab according to claim 1, wherein the set of indexing holes are positioned in semi-circular fashion about the axis.

4. The bunk with adjustable attitude for a vehicle cab according to claim 1, wherein the lock insert is spring biased to extend outwards into engagement with the set of indexing holes and may be manually retracted against a spring bias force.

5. The bunk with adjustable attitude for a vehicle cab according to claim 4, wherein the lock insert is spring biased to releasably hold the lock insert in an engaged position or a retracted position.

6. The bunk with adjustable attitude for a vehicle cab according to claim 1, further comprising a level that measures the pitch or roll of the mattress support surface with respect to a horizontal plane.

7. A bunk with adjustable attitude for a vehicle cab, comprising:
   a hinge;
   a first bunk frame pivotably mounted to hinge about a first axis;
   a second bunk frame provided with a mattress support surface, the second bunk frame being pivotable along with the first bunk frame about the first axis and pivotably mounted to the first bunk frame about a second axis that extends at a 90° angle with respect to the first axis so that pitch and roll of the mattress support surface are selectively adjustable; and
   a first lock insert that releasably engages a first set of indexing holes to releasably hold the first bunk frame and the second bunk frame at a plurality of selectable pivot angles about the first axis and a second lock insert that releasably engages a second set of indexing holes to releasably hold the second bunk frame at a plurality of selectable pivot angles about the second axis.

8. The bunk with adjustable attitude for a vehicle cab according to claim 7, further comprising a vehicle that includes the vehicle cab and a cab floor, wherein the plurality of selectable pivot angles allow the mattress support surface to selectively extend in a plane that better approximates being co-planar with a horizontal plane relative to a plane of the cab floor when the vehicle is on a non-level surface.

9. The bunk with adjustable attitude for a vehicle cab according to claim 7, wherein the first and second sets of indexing holes are positioned in semi-circular fashion about the respective first and second axes and either the first lock insert or the first set of indexing holes fixed relative to the first bunk frame and pivotable about the first axis and either the second lock insert or second set of indexing holes fixed relative to the second bunk frame and pivotable about the second axis so that as the first and second bunk frames pivot, the first and second lock inserts align with the respective first and second set of indexing holes at the plurality of selectable pivot angles.

10. The bunk with adjustable attitude for a vehicle cab according to claim 7, wherein the first and second lock inserts are spring biased to extend outwards into engagement with the first and second set of indexing holes and may be manually retracted against a spring bias force.

11. The bunk with adjustable attitude for a vehicle cab according to claim 10, wherein the first and second lock insert are spring biased to releasably hold the first and second lock inserts in an engaged position or a retracted position.

12. The bunk with adjustable attitude for a vehicle cab according to claim 7, further comprising levels that measure the pitch and roll of the mattress support surface with respect to a horizontal plane.

13. The bunk with adjustable attitude for a vehicle cab according to claim 1, wherein the bunk frame in the vertically stowed position is configured to be perpendicular relative to a cab floor of the vehicle cab, wherein the mattress support surface is configured to be inaccessible in the vertically stowed position and accessible in the plurality of horizontally deployed positions.

14. The bunk with adjustable attitude for a vehicle cab according to claim 1, wherein the bunk frame is pivotably mounted so that the pitch and roll of the mattress support surface may be selectively adjusted.

15. The bunk with adjustable attitude for a vehicle cab according to claim 1, further comprising at least one level that measures the pitch and roll of the mattress support surface with respect to a horizontal plane.

\* \* \* \* \*